(12) United States Patent
Allen et al.

(10) Patent No.: US 11,847,710 B2
(45) Date of Patent: Dec. 19, 2023

(54) CONTRACT ANALYTIC BINDING AND PROVENANCE

(71) Applicant: International Business Machines Corporation, Armonk, NY (US)

(72) Inventors: Corville O. Allen, Morrisville, NC (US); Pratul Gupta, Lexington, MA (US); Francisco Phelan Curbera, Hastings On Hudson, NY (US); Richard Martin Scott, Flower Mound, TX (US)

(73) Assignee: International Business Machines Corporation, Armonk, NY (US)

( * ) Notice: Subject to any disclaimer, the term of this patent is extended or adjusted under 35 U.S.C. 154(b) by 225 days.

(21) Appl. No.: 17/132,594

(22) Filed: Dec. 23, 2020

(65) Prior Publication Data
US 2022/0198590 A1   Jun. 23, 2022

(51) Int. Cl.
*G06Q 50/18*    (2012.01)
*G06Q 20/06*    (2012.01)

(52) U.S. Cl.
CPC ........... *G06Q 50/18* (2013.01); *G06Q 20/065* (2013.01)

(58) Field of Classification Search
None
See application file for complete search history.

(56) References Cited

U.S. PATENT DOCUMENTS

| | | | |
|---|---|---|---|
| 10,764,752 B1 * | 9/2020 | Avetisov | H04W 12/08 |
| 2004/0148373 A1 | 7/2004 | Childress et al. | |
| 2017/0287090 A1 * | 10/2017 | Hunn | G06Q 50/18 |
| 2018/0005186 A1 | 1/2018 | Hunn | |
| 2018/0365201 A1 * | 12/2018 | Hunn | G06F 40/134 |
| 2019/0303623 A1 * | 10/2019 | Reddy | G06F 8/71 |
| 2020/0065300 A1 * | 2/2020 | Yang | H04L 9/50 |
| 2020/0357084 A1 * | 11/2020 | Lerato Hunn | H04L 9/32 |

(Continued)

FOREIGN PATENT DOCUMENTS

WO   WO-2020124317 A1 *   6/2020   ............. G06F 16/27

OTHER PUBLICATIONS

"Smart Contract and Virtual Machine," Hashgard, Jul. 29, 2019, available online at https://hashgard.medium.com/smart-contract-and-virtual-machine-2406edfd3dbe (Year: 2019).*

(Continued)

*Primary Examiner* — Jan P Mincarelli
(74) *Attorney, Agent, or Firm* — Stephen J. Walder, Jr.; James Olsen

(57) ABSTRACT

A mechanism is provided to implement a contract analytic binding and provenance system. The mechanism loads contract rules for an agreement between a plurality of contract parties and creates an analytic entry per rule to form a set of analytic entries, Each analytic entry is associated with an executable analytic function. The mechanism assigns each analytic entry a directed acyclic graph vertex. The mechanism confirms alignment between the contract rules and the set of analytic entries and stores the set of analytic entries in peer ledgers associated with the plurality of contract parties. The mechanism activates the set of analytic entries responsive to confirming provenance of the peer ledgers associated with the plurality of contract parties.

20 Claims, 4 Drawing Sheets

(56) References Cited

U.S. PATENT DOCUMENTS

2021/0044976 A1* 2/2021 Avetisov ............. H04L 63/0815
2022/0038289 A1* 2/2022 Huang ................... H04L 63/12

OTHER PUBLICATIONS

Abrahams, Alan et al., "An Asynchronous Rule-Based Approach for Business Process Automation Using Obligations", Proc. 2002 ACM SIGPLAN Workshop on Rule-based Programming (RULE '02). Oct. 2002, 12 pages.

Alberti, Marco et al., "Expressing and Verifying Business Contracts with Abductive Logic Programming", International Journal of Electronic Commerce, vol. 12, No. 4, Summer 2008: 30 pages.

Governatori, Guido et al., "Compliance checking between business processes and business contracts", 10th IEEE International Enterprise Distributed Object Computing Conference (EDOC'06), Oct. 2006, 10 pages.

Iwaihara, Mizuho et al., "An Integrated Model of Workflows, e-Contracts and Solution Implementation", In Proceedings of the 2004 ACM Symposium on Applied Computing (SAC '04). Mar. 2004, 6 pages.

Linington, Peter F. et al., "Using Policies in the Checking of Business to Business Contracts", POLICY 2003. IEEE 4th International Workshop on Policies for Distributed Systems and Networks, Lake Como, Italy, Jun. 2003, 12 pages.

Semmelrodt, Franziska et al., "Modeling the Resource Perspective of Business Process Compliance Rules with the Extended Compliance Rule Graph", 15th International Conference, BPMDS 2014, 19th International Conference, EMMSAD 2014, Held at CAiSE 2014, Thessaloniki, Greece, Jun. 16-17, 2014, 15 pages.

* cited by examiner

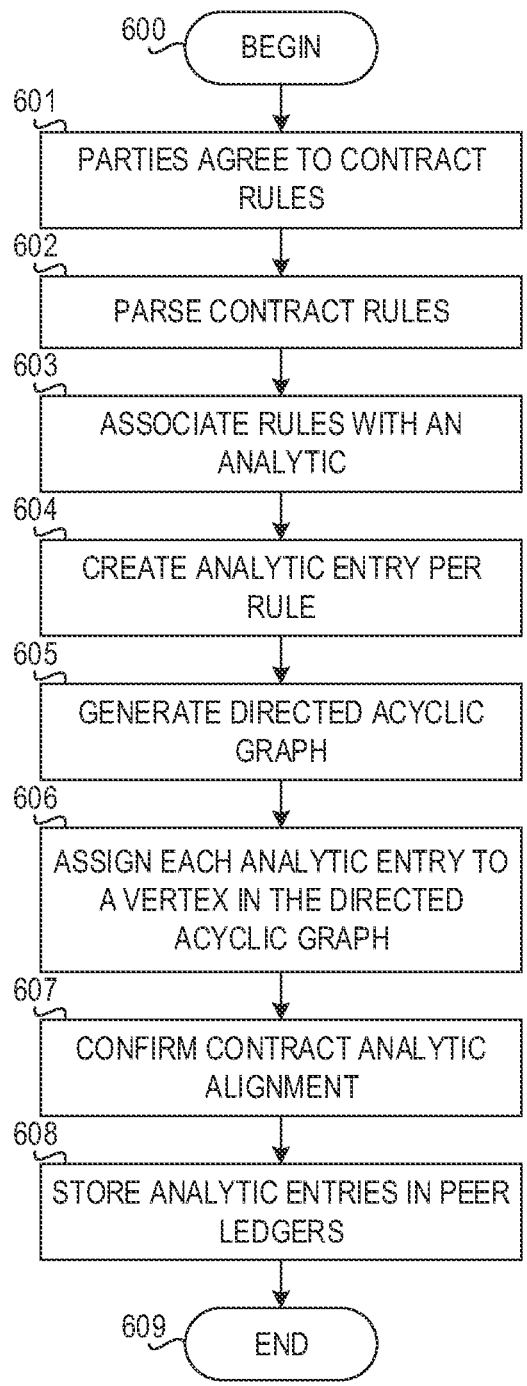
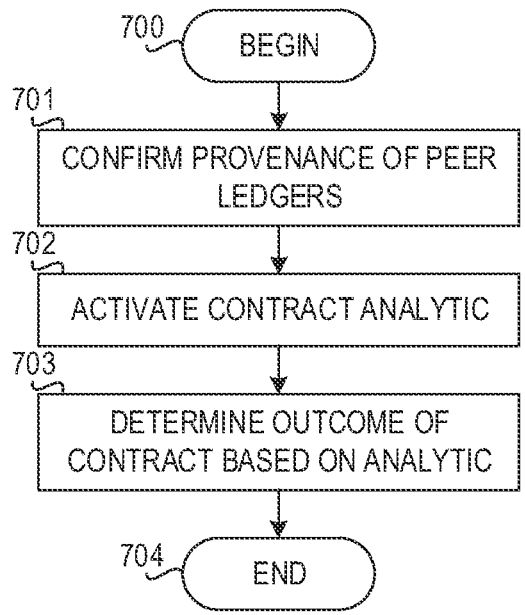

CONTRACT ANALYTIC BINDING AND PROVENANCE

BACKGROUND

The present application relates generally to an improved data processing apparatus and method and more specifically to mechanisms for leveraging cognitive computing and artificial intelligence mechanisms for contract analytic binding and provenance.

A blockchain is a decentralized, distributed, and oftentimes public, digital ledger consisting of records called blocks that is used to record transactions across many computers so that any involved block cannot be altered retroactively, without the alteration of all subsequent blocks. This allows the participants to verify and audit transactions independently and relatively inexpensively. A blockchain database is managed autonomously using a peer-to-peer network and a distributed timestamping server. They are authenticated by mass collaboration powered by collective self-interests. Such a design facilitates robust workflow where participants' uncertainty regarding data security is marginal. A blockchain has been described as a value-exchange protocol. A blockchain can maintain title rights because, when properly set up to detail the exchange agreement, it provides a record that compels offer and acceptance.

A smart contract is a computer program or a transaction protocol that is intended to automatically execute, control, or document legally relevant events and actions according to the terms of a contract or an agreement. The objectives of smart contracts are the reduction of need in trusted intermediators, arbitrations, and enforcement costs, fraud losses, as well as the reduction of malicious and accidental exceptions. Once a smart contract is deployed, it cannot be updated.

SUMMARY

This Summary is provided to introduce a selection of concepts in a simplified form that are further described herein in the Detailed Description. This Summary is not intended to identify key factors or essential features of the claimed subject matter, nor is it intended to be used to limit the scope of the claimed subject matter.

In one illustrative embodiment, a method is provided in a data processing system comprising at least one processor and at least one memory, the at least one memory comprising instructions executed by the at least one processor to implement a contract analytic binding and provenance system. The method comprises loading, by the contract analytic binding and provenance system, contract rules for an agreement between a plurality of contract parties. The method further comprises creating, by the contract analytic binding and provenance system, an analytic entry per rule to form a set of analytic entries, wherein each analytic entry is associated with an executable analytic function and assigning, by the contract analytic binding and provenance system, each analytic entry a directed acyclic graph vertex. The method further comprises confirming, by the contract analytic binding and provenance system, alignment between the contract rules and the set of analytic entries, storing, by the contract analytic binding and provenance system, the set of analytic entries in peer ledgers associated with the plurality of contract parties, and activating, by the contract analytic binding and provenance system, the set of analytic entries responsive to confirming provenance of the peer ledgers associated with the plurality of contract parties.

In other illustrative embodiments, a computer program product comprising a computer useable or readable medium having a computer readable program is provided. The computer readable program, when executed on a computing device, causes the computing device to perform various ones of, and combinations of, the operations outlined above with regard to the method illustrative embodiment.

In yet another illustrative embodiment, a system/apparatus is provided. The system/apparatus may comprise one or more processors and a memory coupled to the one or more processors. The memory may comprise instructions which, when executed by the one or more processors, cause the one or more processors to perform various ones of, and combinations of, the operations outlined above with regard to the method illustrative embodiment.

These and other features and advantages of the present invention will be described in, or will become apparent to those of ordinary skill in the art in view of, the following detailed description of the example embodiments of the present invention.

BRIEF DESCRIPTION OF THE DRAWINGS

The invention, as well as a preferred mode of use and further objectives and advantages thereof, will best be understood by reference to the following detailed description of illustrative embodiments when read in conjunction with the accompanying drawings, wherein:

FIG. 6 is a flowchart illustrating operation of a mechanism for contract analytic binding in accordance with an illustrative embodiment; and FIG. 7 is a flowchart illustrating operation of a mechanism for contract analytic provenance in accordance with an illustrative embodiment.

DETAILED DESCRIPTION

Figure 1:
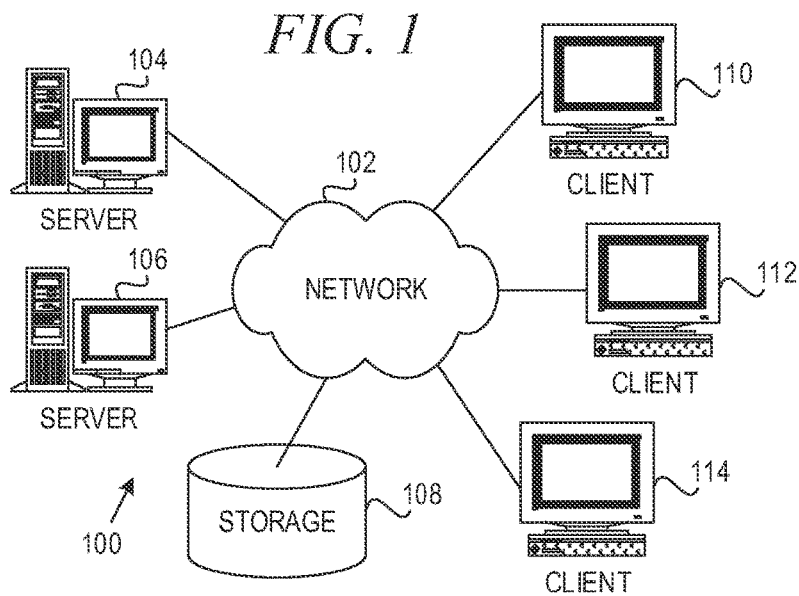
FIG. 1 is an example diagram of a distributed data processing system in which aspects of the illustrative embodiments may be implemented.

In Value Based Agreements, there is a contract, usually between two entities, to determine an outcome. Then, based on that outcome, some business benefit is performed to either or both parties. In most cases, the business benefit is a payment, a rebate, or some premium to an originally agreed-upon price. This can be a percentage or a discreet amount depending on the contract.

The contract has certain rules defined, which are sometimes in the form of inclusion and exclusion criteria, and the outcome is based on some metric tied to the product of that inclusion and exclusion criteria for a data set. These contracts usually end up in some dispute or adjudication due to the proof that the analysis on the data set, agreement on the rules and how they are applied to the data set, and agreement on the actual outcome are in question.

There is not enough provenance and transparency that all these activities, including the contract, rules for analysis, and the outcome, are met and how they are met. There is a need for a better way for both parties to trust the data, trust the analytics that are executed, and trust the outcome without the need for a long and potentially painful adjudication of the agreement. An analytic is a routine or function written in software code for used for the discovery, interpretation, and communication of meaningful patterns in data. An analytic may entail applying data patterns towards effective decision making.

The illustrative embodiments provide a contract analytic binding and provenance system that creates a set of analytics that is tied to a set of contract rules. The analytics must be executed in order. The mechanisms of the illustrative embodiments ensure provenance and immutability of the analytics for the contract rules, while verifying against a set of previously set immutable entries to ensure the analytics match the rule set that is the basis of the agreement between multiple parties.

Before beginning the discussion of the various aspects of the illustrative embodiments and the improved computer operations performed by the illustrative embodiments, it should first be appreciated that throughout this description the term "mechanism" will be used to refer to elements of the present invention that perform various operations, functions, and the like. A "mechanism," as the term is used herein, may be an implementation of the functions or aspects of the illustrative embodiments in the form of an apparatus, a procedure, or a computer program product. In the case of a procedure, the procedure is implemented by one or more devices, apparatus, computers, data processing systems, or the like. In the case of a computer program product, the logic represented by computer code or instructions embodied in or on the computer program product is executed by one or more hardware devices in order to implement the functionality or perform the operations associated with the specific "mechanism." Thus, the mechanisms described herein may be implemented as specialized hardware, software executing on hardware to thereby configure the hardware to implement the specialized functionality of the present invention which the hardware would not otherwise be able to perform, software instructions stored on a medium such that the instructions are readily executable by hardware to thereby specifically configure the hardware to perform the recited functionality and specific computer operations described herein, a procedure or method for executing the functions, or a combination of any of the above.

The present description and claims may make use of the terms "a", "at least one of", and "one or more of" regarding particular features and elements of the illustrative embodiments. It should be appreciated that these terms and phrases are intended to state that there is at least one of the particular feature or element present in the particular illustrative embodiment, but that more than one can also be present. That is, these terms/phrases are not intended to limit the description or claims to a single feature/element being present or require that a plurality of such features/elements be present. To the contrary, these terms/phrases only require at least a single feature/element with the possibility of a plurality of such features/elements being within the scope of the description and claims.

Moreover, it should be appreciated that the use of the term "engine," if used herein with regard to describing embodiments and features of the invention, is not intended to be limiting of any particular implementation for accomplishing and/or performing the actions, steps, processes, etc., attributable to and/or performed by the engine. An engine may be, but is not limited to, software, hardware and/or firmware or any combination thereof that performs the specified functions including, but not limited to, any use of a general and/or specialized processor in combination with appropriate software loaded or stored in a machine-readable memory and executed by the processor. Further, any name associated with a particular engine is, unless otherwise specified, for purposes of convenience of reference and not intended to be limiting to a specific implementation. Additionally, any functionality attributed to an engine may be equally performed by multiple engines, incorporated into and/or combined with the functionality of another engine of the same or different type, or distributed across one or more engines of various configurations.

In addition, it should be appreciated that the following description uses a plurality of various examples for various elements of the illustrative embodiments to further illustrate example implementations of the illustrative embodiments and to aid in the understanding of the mechanisms of the illustrative embodiments. These examples intended to be non-limiting and are not exhaustive of the various possibilities for implementing the mechanisms of the illustrative embodiments. It will be apparent to those of ordinary skill in the art in view of the present description that there are many other alternative implementations for these various elements that may be utilized in addition to, or in replacement of, the examples provided herein without departing from the spirit and scope of the present invention.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a wave aide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions Which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 2:
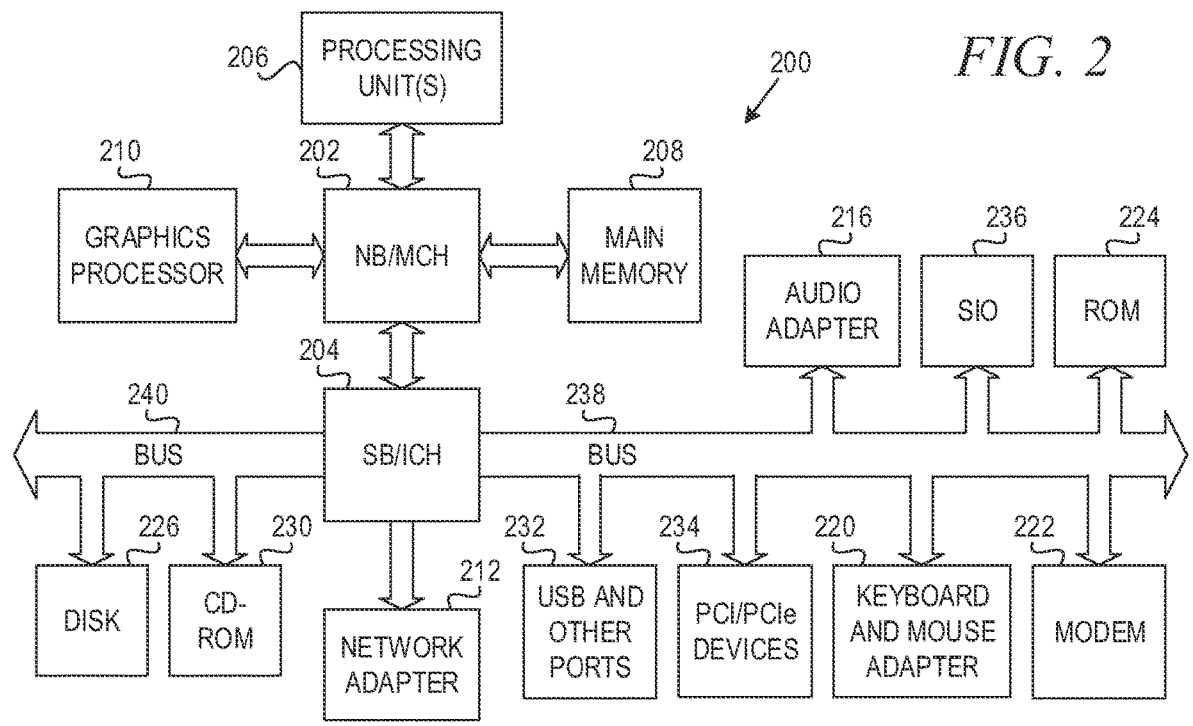
FIG. 2 is an example block diagram of a computing device in which aspects of the illustrative embodiments may be implemented.

The illustrative embodiments may be utilized in many different types of data processing environments. In order to provide a context for the description of the specific elements and functionality of the illustrative embodiments, FIGS. 1 and 2 are provided hereafter as example environments in which aspects of the illustrative embodiments may be implemented. It should be appreciated that FIGS. 1 and 2 are only examples and are not intended to assert or imply any limitation regarding the environments in which aspects or embodiments of the present invention may be implemented. Many modifications to the depicted environments may be made without departing from the spirit and scope of the present invention.

FIG. 1 depicts a pictorial representation of an example distributed data processing system in which aspects of the illustrative embodiments may be implemented. Distributed data processing system 100 may include a network of computers in which aspects of the illustrative embodiments may be implemented. The distributed data processing system 100 contains at least one network 102, which is the medium used to provide communication links between various devices and computers connected within distributed data processing system 100. The network 102 may include connections, such as wire, wireless communication links, or fiber optic cables.

In the depicted example, server 104 and server 106 are connected to network 102 along with storage unit 108. In addition, clients 110, 112, and 114 are also connected to network 102, These clients 110, 112, and 114 may be, for example, personal computers, network computers, or the like. In the depicted example, server 104 provides data, such as boot files, operating system images, and applications to the clients 110, 112, and 114. Clients 110, 112, and 114 are clients to server 104 in the depicted example. Distributed data processing system 100 may include additional servers, clients, and other devices not shown.

In the depicted example, distributed data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, the distributed data processing system 100 may also be implemented to include a number of different types of networks, such as for example, an intranet, a local area network (LAN), a wide area network (WAN), or the like. As stated above, FIG. 1 is intended as an example, not as an architectural limitation for different embodiments of the present invention, and therefore, the particular elements shown in FIG. 1 should not be considered limiting with regard to the environments in which the illustrative embodiments of the present invention may be implemented.

As shown in FIG. 1, one or more of the computing devices, e.g., server 104, may be specifically configured to implement a system for contract analytic binding and provenance. The configuring of the computing device may comprise the providing of application specific hardware, firmware, or the like to facilitate the performance of the operations and generation of the outputs described herein regarding the illustrative embodiments. The configuring of the computing device may also, or alternatively, comprise the providing of software applications stored in one or more storage devices and loaded into memory of a computing device, such as server 104, for causing one or more hardware processors of the computing device to execute the software applications that configure the processors to perform the operations and generate the outputs described herein with regard to the illustrative embodiments. Moreover, any combination of application specific hardware, firmware, software applications executed on hardware, or the like, may be used without departing from the spirit and scope of the illustrative embodiments.

It should be appreciated that once the computing device is configured in one of these ways, the computing device becomes a specialized computing device specifically configured to implement the mechanisms of the illustrative embodiments and is not a general-purpose computing device. Moreover, as described hereafter, the implementation of the mechanisms of the illustrative embodiments improves the functionality of the computing device and provides a useful and concrete result that facilitates contract analytic binding and provenance. These computing devices, or data processing systems, may comprise various hardware elements which are specifically configured, either through hardware configuration, software configuration, or a combination of hardware and software configuration, to implement one or more of the systems/subsystems described herein. FIG. 2 is a block diagram of just one example data processing system in which aspects of the illustrative embodiments may be implemented. Data processing system 200 is an example of a computer, such as server 104 in FIG. 1, in which computer usable code or instructions implementing the processes and aspects of the illustrative embodiments of the present invention may be located and/or executed so as to achieve the operation, output, and external effects of the illustrative embodiments as described herein.

In the depicted example, data processing system 200 employs a hub architecture including north bridge and memory controller hub (NB/MCH) 202 and south bridge and input/output (I/O) controller hub (SB/ICH) 204, Processing unit 206, main memory 208, and graphics processor 210 are connected to NB/MCH 202. Graphics processor 210 may be connected to NB/MCH 202 through an accelerated graphics port (AGP).

In the depicted example, local area network (LAN) adapter 212 connects to SB/ICH 204. Audio adapter 216, keyboard and mouse adapter 220, modem 222, read only memory (ROM) 224, hard disk drive (HDD) 226, CD-ROM drive 230, universal serial bus (USB) ports and other communication ports 232, and PCI/PCIe devices 234 connect to SB/ICH 204 through bus 238 and bus 240. PCI/PCIe devices may include, for example, Ethernet adapters, add-in cards, and PC cards for notebook computers. PCI uses a card bus controller, while PCIe does not. ROM 224 may be, for example, a flash basic input/output system (BIOS).

HDD 226 and CD-ROM drive 230 connect to SB/ICH 204 through bus 240, HDD 226 and CD-ROM drive 230 may use, for example, an integrated drive electronics (IDE) or serial advanced technology attachment (SATA) interface. Super I/O (SIO) device 236 may be connected to SB/ICH 204.

An operating system runs on processing unit 206. The operating system coordinates and provides control of various components within the data processing system 200 in FIG. 2. As a client, the operating system may be a commercially available operating system such as Microsoft® Windows 10®. An object-oriented programming system, such as the Java™ programming system, may run in conjunction with the operating system and provides calls to the operating system from Java™ programs or applications executing on data processing system 200.

As a server, data processing system 200 may be, for example, an IBM eServer™ System computer system, Power™ processor-based computer system, or the like, running the Advanced Interactive Executive (AIX®) operating system or the LINUX® operating system. Data processing system 200 may be a symmetric multiprocessor (SMP) system including a plurality of processors in processing unit 206. Alternatively, a single processor system may be employed.

Instructions for the operating system, the object-oriented programming system, and applications or programs are located on storage devices, such as HDD 226, and may be loaded into main memory 208 for execution by processing unit 206. The processes for illustrative embodiments of the present invention may be performed by processing unit 206 using computer usable program code, which may be located in a memory such as, for example, main memory 208, ROM 224, or in one or more peripheral devices 226 and 230, for example.

A bus system, such as bus 238 or bus 240 as shown in FIG. 2, may be comprised of one or more buses. Of course, the bus system may be implemented using any type of communication fabric or architecture that provides for a transfer of data between different components or devices attached to the fabric or architecture. A communication unit, such as modem 222 or network adapter 212 of FIG. 2, may include one or more devices used to transmit and receive data. A memory may be, for example, main memory 208, ROM 224, or a cache such as found in NB/MCH 202 in FIG. 2.

As mentioned above, in some illustrative embodiments the mechanisms of the illustrative embodiments may be implemented as application specific hardware, firmware, or the like, application software stored in a storage device, such as HDD 226 and loaded into memory, such as main memory 208, for executed by one or more hardware processors, such as processing unit 206, or the like. As such, the computing device shown in FIG. 2 becomes specifically configured to implement the mechanisms of the illustrative embodiments and specifically configured to perform the operations and generate the outputs described hereafter with regard to the contract analytic binding and provenance system.

Those of ordinary skill in the art will appreciate that the hardware in FIGS. 1 and 2 may vary depending on the implementation. Other internal hardware or peripheral devices, such as flash memory, equivalent non-volatile memory, or optical disk drives and the like, may be used in addition to or in place of the hardware depicted in FIGS. 1 and 2. Also, the processes of the illustrative embodiments may be applied to a multiprocessor data processing system, other than the SNIP system mentioned previously, without departing from the spirit and scope of the present invention.

Moreover, the data processing system 200 may take the form of any of a number of different data processing systems including client computing devices, server computing devices, a tablet computer, laptop computer, telephone or other communication device, a personal digital assistant (PDA), or the like. In some illustrative examples, data processing system 200 may be a portable computing device that is configured with flash memory to provide non-volatile memory for storing operating system files and/or user-generated data, for example. Essentially, data processing system 200 may be any known or later developed data processing system without architectural limitation.

Figure 3:
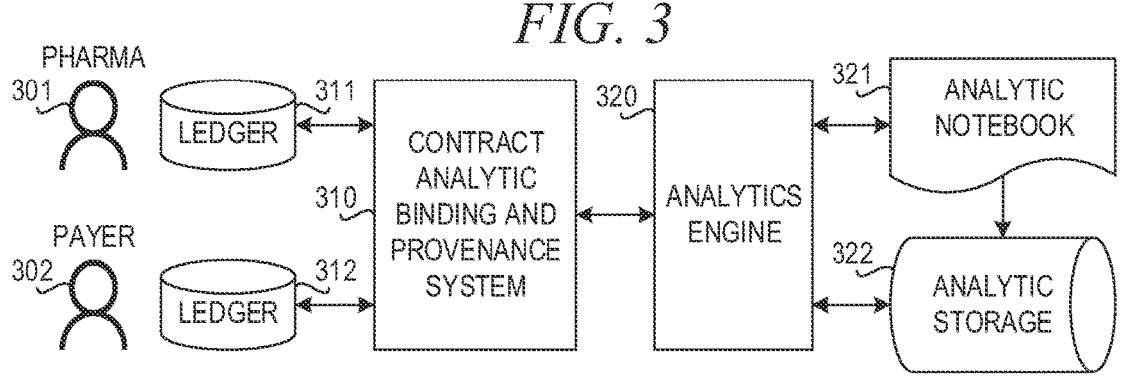
FIG. 3 is a block diagram illustrating operation of a system for contract analytic binding and provenance in accordance with an illustrative embodiment.

FIG. 3 is a block diagram illustrating operation of a system for contract analytic binding and provenance in accordance with an illustrative embodiment. Contract analytic binding and provenance system 310 manages a contract between two parties. In the depicted example, the parties are a pharmaceutical company party (pharma) 301 and a health insurance payer party (payer) 302. For instance, the pharmaceutical company 301 my agree to provide a drug that will lower cholesterol in a population for an agreed-upon price, and if the drug does not lower cholesterol by 10% or the payer 302 will receive a 5% rebate. In accordance with the illustrative embodiment, contract analytic binding and provenance system uses smart contracts to automatically execute, control, and document legally relevant events and actions according to the terms of the contract or agreement. These events and actions are recorded in ledgers 311, 312 using blockchain technology. That is pharma peer ledger 311 and payer peer ledger 312 provide an immutable record of the contract terms and events that both parties can trust.

While the depicted example is between a pharmaceutical company and a health care payer, the mechanisms of the illustrative embodiments may be applied to any contract or agreement for which the terms and outcome of the agreement are determined using analytics. For example, a contract may define certain rules, such as inclusion criteria, exclusion criteria, and performance outcome. In the above example, the pharmaceutical company agrees to provide a drug that will lower cholesterol in a population, and the inclusion criteria and the exclusion criteria define the population. The parties must agree on these inclusion criteria and exclusion criteria before the contract can be deployed. That is, the parties must agree on which patients are to be included in the analytics and which patients are excluded in the analytics. Furthermore, the parties must agree on how the performance outcome is determined. For instance, in the above example the parties must agree on whether the agreement is satisfied if any 10% decrease in cholesterol occurs of if the lowering of cholesterol must be maintained over a given period of time. These criteria are stored as a set of rules in peer ledgers 311, 312.

Contract analytic binding and provenance system 310 communicates with analytics engine 320 to define and execute the analytics for the contract. Contract analytic binding and provenance system 310 loads the set of rules from peer ledgers 311, 312 and creates an analytic entry for each rule with ordering preserved and associated for the analytic entry. The analytics are associated with executables in analytic notebook 321. As an example, the executables may be a Python® programming language functions in a Jupyter™ Notebook. PYTHON is a registered trademark of the Python Software Foundation (PSF) in the United States, other countries, or both. JUPYTER is a trademark of the NumFOCUS foundation in the United States, other countries, or both. The analytics are executed from analytic notebook 321 against data sets in analytic storage 322, and results are returned to analytics engine 320. The associated analytics are tied to a directed acyclic graph (DAG) vertex as a position in the execution order. A directed acyclic graph is a directed graph with no directed cycles. That is, it consists of vertices and edges, with each edge directed from one vertex to another, such that there is no way to start at any vertex v and follow a consistently directed sequence of edges that eventually loops back to v again.

Analytic storage 322 is a storage for all things related to the analytic execution. Analytic storage 322 includes:
1) Analytic: in this embodiment, the analytic is a Jupyter™ Notebook. In another embodiment, the analytic comprises computer program code deployed in a Kubernetes container. In another embodiment, the analytic is a Web Service (likely deployed in a container), an Apache Spark analytic.
2) The DAG storage for the analytics. This is usually stored in a database (e.g., PostgresSQL or File System).

The DAG is stored in analytic storage 322. At execution time, a representation of what is executed in stored on the ledger and should match the sequence specified in the DAG, so that provenance also must be stored on the blockchain, but perhaps in a simplified form. One way is a hash of the final DAG (taking the DAG storage entry and running a hash on it to produce a hash value to confirm. The DAG may be represented as a data structure and stored on the file system in its simplest form.

Contract analytic binding and provenance system 310 checks the analytic entries against the peer ledgers 311, 312 for the contract and the DAG by parsing the set of rules that are related to the contract, where the rules must be associated with an analytic, and creating an analytic entry per rule tied to the DAG and matching the order in the DAG. Contract analytic binding and provenance system 310 then stores an entry in the peer ledgers activating the contract analytic set defined by the analytic entries.

Figure 4:
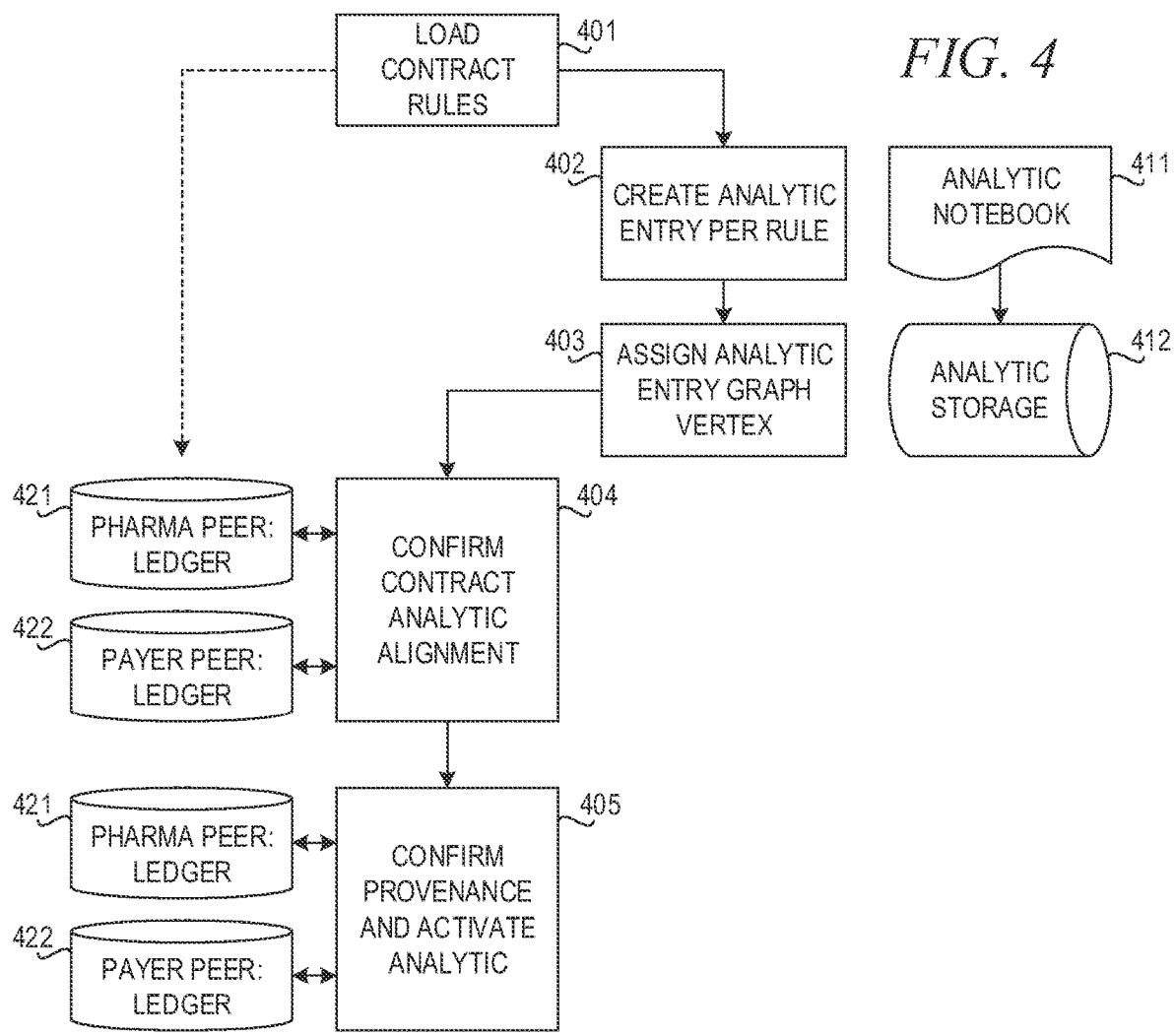
FIG. 4 depicts an operational flow for contract analytic binding and provenance in accordance with an illustrative embodiment.

FIG. 4 depicts an operational flow for contract analytic binding and provenance in accordance with an illustrative embodiment. The contract analytic binding and provenance system loads contract rules (block 401) agreed upon by the parties, which include a pharma party and a payer party in the depicted example. The system creates an analytic entry per rule (block 401). The system uses smart contracts to create an analytic entry that is associated with an executable analytic function, such as a Jupyter™ Notebook (jpynb) version. The system stores a as part of the analytic entry, a reference to the analytic, a hash of the analytic function to serve as a comparison for the function, and an identifier to identify the analytic. The identifier in one embodiment can be the Docker™ image id of the images for the executable analytic. A Docker™ image's ID is a digest, which contains an SHA256 hash of the image's JSON configuration object, Docker™ computer software creates intermediate images during a local image build, for the purposes of maintaining a build cache. An image manifest is created and pushed to a Docker registry when an image is pushed. DOCKER is a trademark of Docker, Inc., in the United States, other countries, or both.

The system then assigns each analytic entry a directed acyclic graph vertex as a position in the execution order (block 403). The system uses smart contracts to store the vertices and edges and paths can be represented as (a, b) in the directed acyclic graph. The path (a, b) is a representation of the edges and the way the graph flows, where (b) is reachable from (a) and b is a direct successor to (a). This allows the system to quickly parse the execution order by confirming the order of vertices to edges in the directed acyclic graph. In another embodiment, a flow executor can execute the entries in the DAG by parsing the data structure for the DAG and executing each analytic based on the vertices and edges.

Next, the system confirms contract analytic alignment (block 404). The system checks the analytic entries against ledger entries in pharma peer ledger 421 and payer peer ledger 422 for the contract and the DAG by parsing the set of rules that are related to the contract. The system checks that the number of applicable rules in a contract are present and represented by vertices in the DAG and where the rules are ordered and checks that the paths align with the edges. As described previously each vertex represents an analytic, and that analytic represents an applicable rule in the contract.

The system confirms provenance and activates the analytic (block 405) by creating an analytic entry per rule tied to the DAG with matching order and storing the entries in pharma peer ledger 421 and payer peer ledger 422. The system receives input representing a set of analytic (Data Model: Analytic) entries that is associated with a contract (Data Model: Contract), The contract has a set of rules (Data Model: Rule) that are defined for the contract. The system receives a representation of the DAG for each analytic and updates the analytic with the vertex and edge information. The system performs a check against the number of rules defined in the contract with the number of analytic entries, confirms that the order matches the DAG and that there is a corresponding analytic executable identified for that analytic. These activities to check and confirm that the data is representative and match expectations from the system confirm that there is provenance in the data representing the contract. The smart contracts execute and calculate this provenance on each peer; consensus is achieved based on the results of the execution of these smart contracts which are the values to be written to the ledger based on the calculations and changes to the data to represent that provenance. Once consensus is reached the data is written to the ledger and is persisted in all the peers of the blockchain network for this contract. As part of this execution the smart contracts activate the contract by updating each analytic entry to set each analytic to activated for an approved contract.

Figure 5:
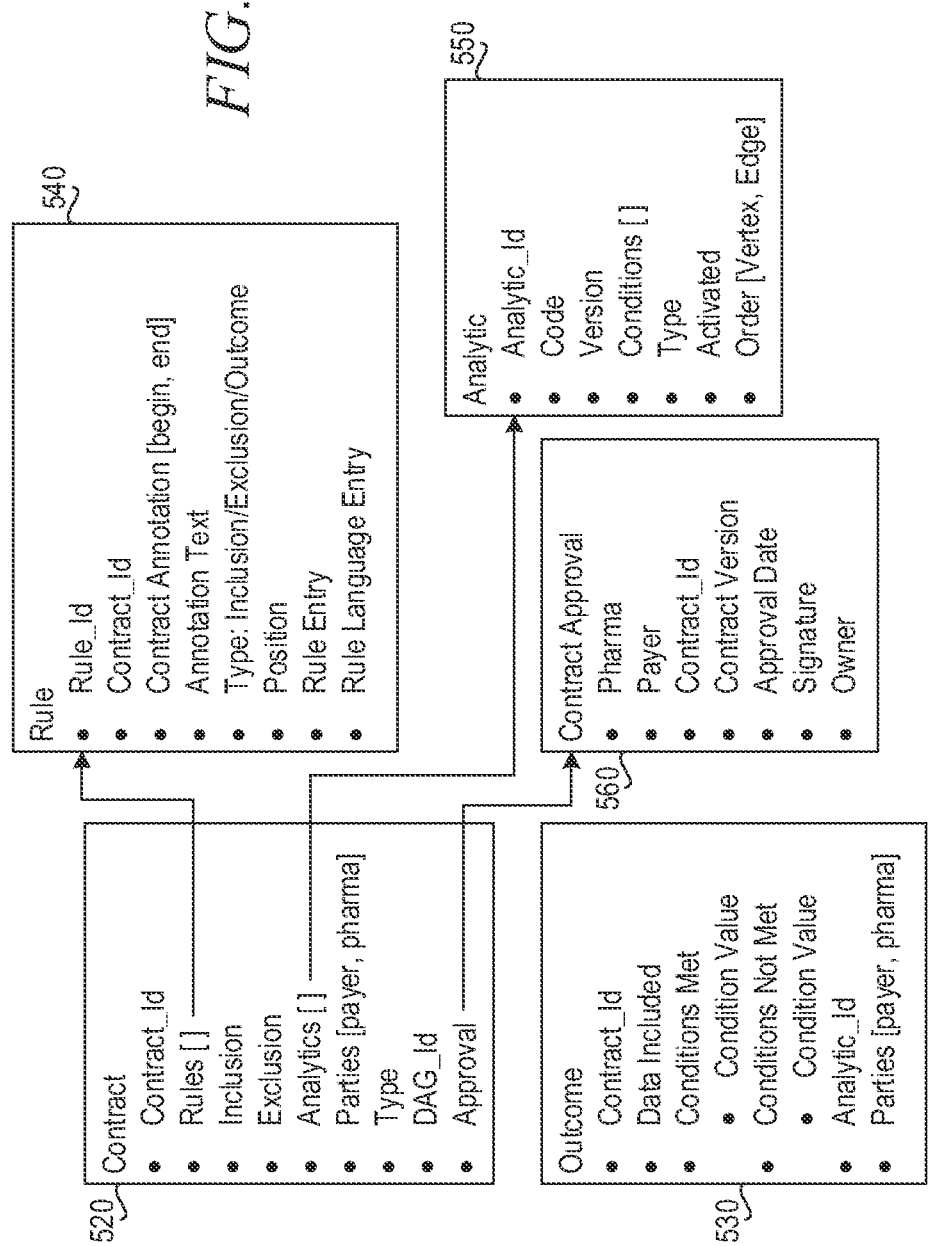
FIG. 5 illustrates data models for contract model provenance and confirmation in accordance with an illustrative embodiment.

FIG. 5 illustrates data models for contract model provenance and confirmation in accordance with an illustrative embodiment. In the data models of FIG. 5, hashes of all data categories are stored on the ledger. Consolidated provenance data are linked to the contract. The lifecycle of the contract is as follows:

1. Contract
2. Data provenance
3. Analytic
4. Outcome

The data models store representations of data including incorrect data, data included, the owner, the parties of the contract, and the contract identifier. In the depicted example, the owner is "payer," and the parties are "payer" and "pharma." The data are pointers or hashes of the data rather than the data itself. Contract data model 520 stores the contract identifier, a set of rules, inclusion criteria, exclusion criteria, analytics to be executed, the parties, and a directed acyclic graph (DAG) identifier. The set of rules point to one or more rule data models 540. The analytics field points to at least one analytic data model 540.

Outcome data model 530 stores the contract identifier, data included, conditions met, conditions not met, an analytic identifier, and the parties of the contract. The conditions met field stores a condition value. The conditions not met field also stores a condition value. Each condition would have a value, whether it is met or not met.

Rule data model 540 stores a rule identifier, a contract identifier, a contract annotation, annotation text, a rule type, a position, a rule entry, and rule language entry. The rule type may be one of the following: inclusion, exclusion, or outcome. Position is where in the list of rules this is located from reading the contract, 1st, 4th, $5^{th}$, etc. Rule Entry is the actual rule defined in a machine-readable form, examples could be a Python™ expression. Contract Annotation is the text covered by the rule, the begin and end on a specific line of the contract. Annotation Text is the actual text found in the contract. Rule Language Entry is the expression language, could be python, pseudo-code, Java, json, etc.

Analytic data model 550 stores the analytic identifier, a hash of the code of the analytic, a version of the analytic, a set of conditions, a type, an activated field, and an order. The code field stores a hash of the code or a pointer to the code of the analytic.

In contract data model 520, the approval field points to contract approval data model 630, which stores a pharma field and a payer field to identify the parties of the contract, a contract identifier, a contract version, an approval date, a signature, and an owner. The signature field holds the public cryptographic signature for the approver of the contract. The contract version is a number or identifier representing the version of the contract, this can be alpha-numeric or numeric.

FIG. 6 is a flowchart illustrating operation of a mechanism (algorithm/component) for contract analytic binding in accordance with an illustrative embodiment. Operation begins (block 600), and the parties agree to contract rules (block 601). The mechanism parses the contract rules (block 602), associates the rules with analytics (block 603), and creates an analytic entry per rule (block 604). The mechanism generates a directed acyclic graph (DAG) (block 605) and assigns each analytic entry to a vertex in the directed acyclic graph (block 606).

Then, the mechanism (algorithm/component) confirms the contract analytic alignment (block 607). The mechanism stores the analytic entries in the peer ledgers (block 608). Thereafter, operation ends (block 609).

FIG. 7 is a flowchart illustrating operation of a mechanism for contract analytic provenance in accordance with an illustrative embodiment. Operation begins (block 700), and the mechanism confirms provenance of the peer ledgers (block 701). The mechanism then activates the contract analytic (block 702) and determines the outcome of the contract based on the analytic (block 703). Thereafter, operation ends (block 704).

As noted above, it should be appreciated that the illustrative embodiments may take the form of an entirely hardware embodiment, an entirely software embodiment or an embodiment containing both hardware and software elements. In one example embodiment, the mechanisms of the illustrative embodiments are implemented in software or program code, which includes but is not limited to firmware, resident software, microcode, etc.

A data processing system suitable for storing and/or executing program code will include at least one processor coupled directly or indirectly to memory elements through a communication bus, such as a system bus, for example. The memory elements can include local memory employed during actual execution of the program code, bulk storage, and cache memories which provide temporary storage of at least some program code in order to reduce the number of times code must be retrieved from bulk storage during execution. The memory may be of various types including, but not limited to, ROM, PROM, EPROM, EEPROM, DRAM, SRAM, Flash memory, solid state memory, and the like.

Input/output or I/O devices (including but not limited to keyboards, displays, pointing devices, etc.) can be coupled to the system either directly or through intervening wired or wireless I/O interfaces and/or controllers, or the like. I/O devices may take many different forms other than conventional keyboards, displays, pointing devices, and the like, such as for example communication devices coupled through wired or wireless connections including, but not limited to, smart phones, tablet computers, touch screen devices, voice recognition devices, and the like, Any known or later developed I/O device is intended to be within the scope of the illustrative embodiments.

Network adapters may also be coupled to the system to enable the data processing system to become coupled to other data processing systems or remote printers or storage devices through intervening private or public networks. Modems, cable modems and Ethernet cards are just a few of the currently available types of network adapters for wired communications. Wireless communication-based network adapters may also be utilized including, but not limited to, 802.11 a/b/g/n wireless communication adapters, Bluetooth wireless adapters, and the like. Any known or later developed network adapters are intended to be within the spirit and scope of the present invention.

The description of the present invention has been presented for purposes of illustration and description, and is not intended to be exhaustive or limited to the invention in the form disclosed. Many modifications and variations will be apparent to those of ordinary skill in the art without departing from the scope and spirit of the described embodiments. The embodiment was chosen and described in order to best explain the principles of the invention, the practical application, and to enable others of ordinary skill in the art to understand the invention for various embodiments with various modifications as are suited to the particular use contemplated. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method, in a data processing system comprising at least one processor and at least one memory, the at least one memory comprising instructions executed by the at least one processor to implement a contract analytic binding and provenance system, the method comprising:

loading, by the contract analytic binding and provenance system, contract rules for a smart contract between a plurality of contract parties;

creating, by the contract analytic binding and provenance system, an analytic entry per rule to form a set of analytic entries, wherein each analytic entry is associated with an executable analytic function executed from an analytic notebook against one or more data sets in an analytic storage to evaluate criteria of a rule corresponding to the analytic entry, and wherein the analytic entry comprises a container image identifier specifying a container image of the associated executable analytic function;

assigning, by the contract analytic binding and provenance system, each analytic entry a directed acyclic graph vertex of a directed acyclic graph (DAG), wherein the DAG comprises a plurality of DAG vertices associated with different analytic entries and specifies an order in which to execute the executable analytic functions associated with the different analytic entries;

confirming, by the contract analytic binding and provenance system, alignment between the contract rules and the set of analytic entries;

storing, by the contract analytic binding and provenance system, the set of analytic entries in peer ledgers associated with the plurality of contract parties;

receiving, by the contract analytic binding and provenance system, results of executing, at peer computing devices associated with each of the contract parties, a provenance check operation that confirms provenance of the peer ledgers at each peer computing device at least by confirming that a number of the contract rules, and an order of the contract rules, in the smart contract matches the number and order specified in the DAG and that each contract rule has an associated executable analytic function based on an analytic entry of a corresponding DAG vertex in the DAG;

determining, by the contract analytic binding and provenance system, based on the results of executing the provenance check operation, if a consensus of the peer computing devices indicates that the contract rules match the number and order specified in the DAG and each contract rule has an associated executable analytic function; and activating, by the contract analytic binding and provenance system, the set of analytic entries responsive to confirming provenance of the peer ledgers associated with the plurality of contract parties.

2. The method of claim 1, wherein the contract rules comprise inclusion criteria, exclusion criteria, and performance outcome criteria.

3. The method of claim 1, wherein storing the set of analytic entries in peer ledgers associated with the plurality of contract parties comprises storing the set of analytic entries as a blockchain data structure.

4. The method of claim 1, further comprising storing, by the contract analytic binding and provenance system, a contract data model comprising a contract identifier, the contract rules, at least one of one or more inclusion criteria or one or more exclusion criteria, the set of analytic entries, identifiers of the plurality of contract parties, and a DAG identifier of the DAG.

5. The method of claim 4, further comprising storing, by the contract analytic binding and provenance system, a contract approval data model comprising the contract identifier, approvers, a cryptographic signature, an approval date, and a reference to the contract being approved.

6. The method of claim 4, wherein the set of analytics point to one or more analytic data models each comprising an analytic identifier, code, a version, a set of conditions, a type of analytic, an activated field, and an order.

7. The method of claim 4, wherein the set of rules point to one or more rule data models each comprising a rule identifier, a contract identifier, a contract annotation, annotation text, a rule type, a position, a rule entry, and a rule language entry.

8. The method of claim 1, further comprising storing, by the contract analytic binding and provenance system, a contract approval data model comprising a contract identifier associated with the contract, a contract version, an approval date, and a digital signature.

9. A computer program product comprising a computer readable storage medium having a computer readable program stored therein, wherein the computer readable program, when executed on a computing device, causes the computing device to implement a contract analytic binding and provenance system, wherein the computer readable program causes the computing device to:

load, by the contract analytic binding and provenance system, contract rules for a smart contract between a plurality of contract parties;

create, by the contract analytic binding and provenance system, an analytic entry per rule to form a set of analytic entries, wherein each analytic entry is associated with an executable analytic function executed from an analytic notebook against one or more data sets in an analytic storage to evaluate criteria of a rule corresponding to the analytic entry, and wherein the analytic entry comprises a container image identifier specifying a container image of the associated executable analytic function;

assign, by the contract analytic binding and provenance system, each analytic entry a directed acyclic graph vertex of a directed acyclic graph (DAG), wherein the DAG comprises a plurality of DAG vertices associated with different analytic entries and specifies an order in which to execute the executable analytic functions associated with the different analytic entries;

confirm, by the contract analytic binding and provenance system, alignment between the contract rules and the set of analytic entries;

store, by the contract analytic binding and provenance system, the set of analytic entries in peer ledgers associated with the plurality of contract parties;

receive, by the contract analytic binding and provenance system, results of executing, at peer computing devices associated with each of the contract parties, a provenance check operation that confirms provenance of the peer ledgers at each peer computing device at least by confirming that a number of the contract rules, and an order of the contract rules, in the smart contract matches the number and order specified in the DAG and that each contract rule has an associated executable analytic function based on an analytic entry of a corresponding DAG vertex in the DAG;

determine, by the contract analytic binding and provenance system, based on the results of executing the provenance check operation, if a consensus of the peer computing devices indicates that the contract rules match the number and order specified in the DAG and each contract rule has an associated executable analytic function; and activate, by the contract analytic binding and provenance system, the set of analytic entries responsive to confirming provenance of the peer ledgers associated with the plurality of contract parties.

10. The computer program product of claim 9, wherein the contract rules comprise inclusion criteria, exclusion criteria, and performance outcome criteria.

11. The computer program product of claim 9, wherein storing the set of analytic entries in peer ledgers associated with the plurality of contract parties comprises storing the set of analytic entries as a blockchain data structure.

12. The computer program product of claim 9, wherein the computer readable program causes the computing device to store, by the contract analytic binding and provenance system, a contract data model comprising a contract identifier, the contract rules, at least one of one or more inclusion criteria or one or more exclusion criteria, the set of analytic entries, identifiers of the plurality of contract parties, and a DAG identifier of the DAG.

13. The computer program product of claim 12, wherein the computer readable program causes the computing device to store, by the contract analytic binding and provenance system, a contract approval data model comprising the contract identifier, an identifier of approvers, a cryptographic signature, an approval date, and a reference to the contract being approved.

14. The computer program product of claim 12, wherein the set of analytics point to one or more analytic data models each comprising an analytic identifier, code, a version, a set of conditions, a type of analytic, an activated field, and an order.

15. The computer program product of claim 12, wherein the set of rules point to one or more rule data models each comprising a rule identifier, a contract identifier, a contract annotation, annotation text, a rule type, a position, a rule entry, and a rule language entry.

16. An apparatus comprising:
a processor; and
a memory coupled to the processor, wherein the memory comprises instructions which, when executed by the processor, cause the processor to implement a contract analytic binding and provenance system, wherein the instructions cause the processor to:

load, by the contract analytic binding and provenance system, contract rules for a smart contract between a plurality of contract parties;

create, by the contract analytic binding and provenance system, an analytic entry per rule to form a set of analytic entries, wherein each analytic entry is associated with an executable analytic function executed from an analytic notebook against one or more data sets in an analytic storage to evaluate criteria of a rule corresponding to the analytic entry, and wherein the analytic entry comprises a container image identifier specifying a container image of the associated executable analytic function;

assign, by the contract analytic binding and provenance system, each analytic entry a directed acyclic graph vertex of a directed acyclic graph (DAG), wherein the DAG comprises a plurality of DAG vertices associated with different analytic entries and specifies an order in which to execute the executable analytic functions associated with the different analytic entries;

confirm, by the contract analytic binding and provenance system, alignment between the contract rules and the set of analytic entries;

store, by the contract analytic binding and provenance system, the set of analytic entries in peer ledgers associated with the plurality of contract parties;

receive, by the contract analytic binding and provenance system, results of executing, at peer computing devices associated with each of the contract parties, a provenance check operation that confirms provenance of the peer ledgers at each peer computing device at least by confirming that a number of the contract rules, and an order of the contract rules, in the smart contract matches the number and order specified in the DAG and that each contract rule has an associated executable analytic function based on an analytic entry of a corresponding DAG vertex in the DAG;

determine, by the contract analytic binding and provenance system, based on the results of executing the provenance check operation, if a consensus of the peer computing devices indicates that the contract rules match the number and order specified in the DAG and each contract rule has an associated executable analytic function; and activate, by the contract analytic binding and provenance system, the set of analytic entries responsive to confirming provenance of the peer ledgers associated with the plurality of contract parties.

17. The method of claim 1, wherein activating the set of analytic entries comprises persisting, in ledgers of all peers of a blockchain network, data associated with the smart contract.

18. The method of claim 1, wherein analytics executed from the analytics notebook return results to an analytics engine associated with the contract analytic binding and provenance system.

19. The computer program product of claim 9, wherein activating the set of analytic entries comprises persisting, in ledgers of all peers of a blockchain network, data associated with the smart contract.

20. The computer program product of claim 9, wherein analytics executed from the analytics notebook return results to an analytics engine associated with the contract analytic binding and provenance system.

* * * * *